(No Model.)  2 Sheets—Sheet 1.
F. W. MORGAN.
PROCESS OF MANUFACTURING INNER ELASTIC AIR TUBES FOR PNEUMATIC TIRES.
No. 544,627.  Patented Aug. 13, 1895.
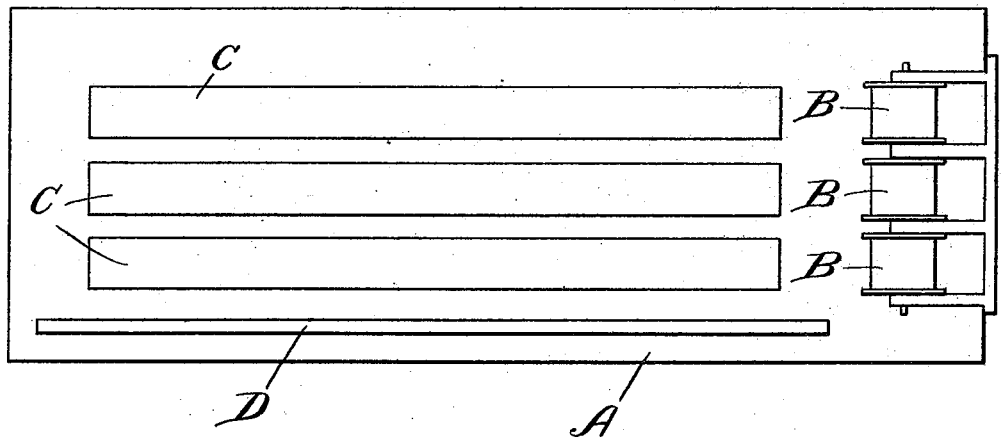
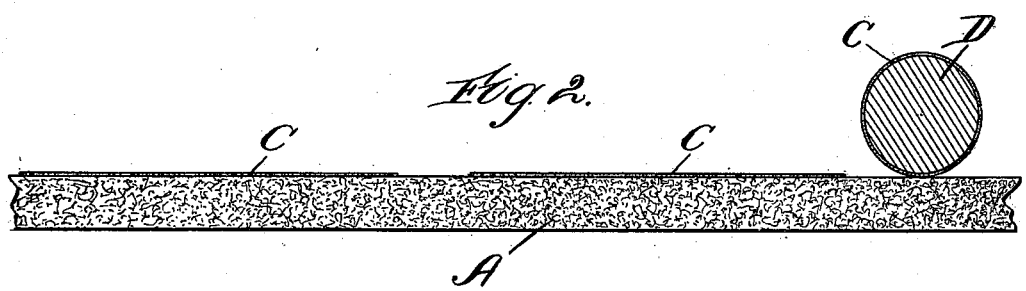
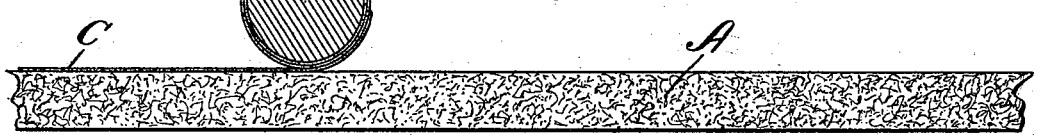

(No Model.) 2 Sheets—Sheet 2.
F. W. MORGAN.
PROCESS OF MANUFACTURING INNER ELASTIC AIR TUBES FOR PNEUMATIC TIRES.
No. 544,627. Patented Aug. 13, 1895.
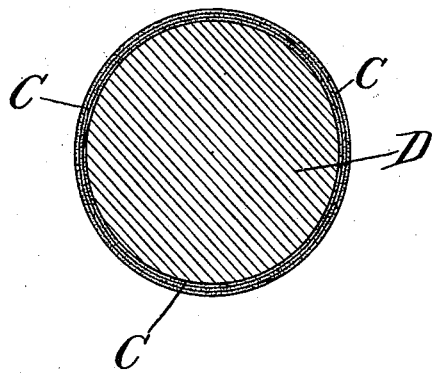
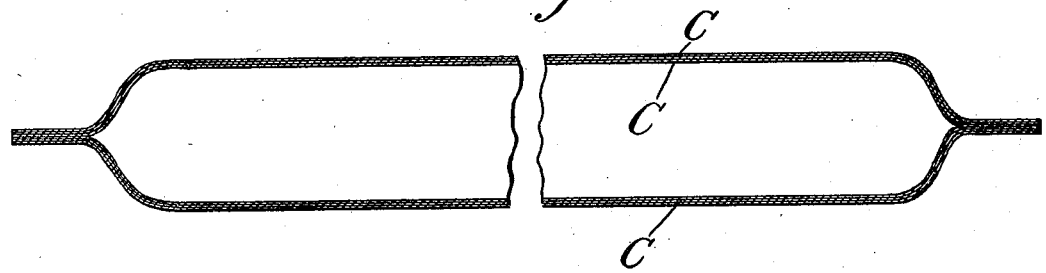
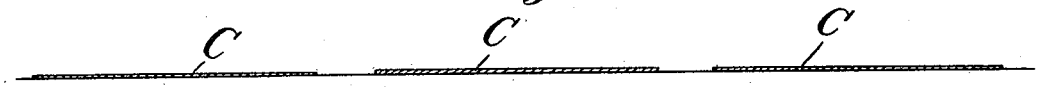

UNITED STATES PATENT OFFICE.

FRED W. MORGAN, OF CHICAGO, ILLINOIS.

PROCESS OF MANUFACTURING INNER ELASTIC AIR-TUBES FOR PNEUMATIC TIRES.

SPECIFICATION forming part of Letters Patent No. 541,627, dated August 13, 1895.

Application filed May 9, 1895. Serial No. 548,672. (No model.)

*To all whom it may concern:*

Be it known that I, FRED W. MORGAN, a citizen of the United States, residing at Chicago, in the county of Cook and State of Illinois, have invented a certain new and useful Improvement in the Process of Manufacturing Inner Elastic Air-Tubes for Pneumatic Tires, of which the following is a specification.

In carrying out my invention I form unvulcanized rubber-stock into long sheets or strips of thin film by passing the stock through suitable calender-rolls, it being understood that the film thus produced can be separated into sheets or long sheets or strips of suitable width, either during or subsequent to its formation. I then spread upon an elastic bed or cushion-table several sheets of this unvulcanized rubber film, the width of each sheet being a little greater than the circumference of the proposed inner elastic multiply air-tube which is to be constructed, so that each sheet of film can lap upon itself to a suitable extent when rolled into tubular form. The length of each of these sheets of film is equal to the length of the tube which is to be formed by rolling the sheets about a long cylindric rod or mandrel, and the said sheets are arranged side by side upon the flat yielding surface of the cushion-table, so that they can be successively rolled about the mandrel and upon one another. I then successively roll these sheets of film about a long cylindric rod or mandrel, and to such end the mandrel is rolled over the sheets of film, so as to first take up and roll one sheet and then roll the second piece directly upon and about the first piece, and so on, according to the number of sheets employed. During the process of thus rolling up the plies of film the mandrel is pressed down, so as to compress the film between the mandrel and the cushion-table, and thereby exclude air-bubbles from between the sheets or plies of film, it being observed that if air-bubbles are left between such plies the tube will be imperfect. After the sheets or plies of film have been rolled up about the mandrel and directly upon one another the multiply tube thus formed is vulcanized, so as to unite the plies as one piece. These plies of film can be made of uniform grade and thickness, or they can be severally made of different kinds of stock or of different thickness, or both, as may be desired. The plies are also preferably so arranged upon the cushion-table preparatory to rolling them up as to bring the laps at different points around the tube, thereby avoiding undesirable thickness at any one point, it being observed that an air-tube for a pneumatic tire is more liable to rupture at the point of junction between a thick and thin portion, and that the rupture at such point occurs as a result of the constant flexions to which the tube is subjected during use. By providing and employing thin rubber film in contradistinction to the thin sheet-rubber commonly used in making inner elastic air-tubes for pneumatic tires, the aggregate thickness of the several plies of film not only need not exceed but can be less than the thickness of the material of an inner tube formed by a single sheet of rubber, and by employing several sheets of film the tube can be made more perfect, since if an imperfection occurs in one sheet of film it will as a rule be covered by a perfect portion of the next adjacent sheet of film, while, on the other hand, if the tube is formed by a single sheet of rubber, an imperfection—such as a small portion of foreign vegetable matter (common in rubber) or a minute air-bubble—will usually result in the formation of a blister in the tube during vulcanization, and thereby render the tube imperfect. I prefer that the ultimate thickness of the tube shall be about three sixty-fourths of an inch thick, although it can be made slightly thinner or slightly thicker. If the plies of film are of equal thickness and the thickness of the tube is to be three sixty-fourths of an inch, each ply of film will of course be one sixty-fourth of an inch thick. For some purposes, however, I propose to employ plies of film of different kinds of rubber-stock and of different thickness, and at the same time such plies can be so graded in thickness and restricted in number as to produce a multiply tube of the same thickness as it would have if composed of plies of equal relative thickness. The vulcanization of this multiply tube serves to unite the plies as one piece, and by arranging the plies so that the laps will be out of register with one another no unduly-thickened portions will occur, owing to the fact that each lap will only involve the additional thickness of one edge portion of a thin sheet of film, and to the further fact that such slightly-thickened portions, caused by the several laps of the several sheets of film, are distributed at different points in the air-tube. The rubber film is delicate, sticky, flimsy, and hard to handle, but by unrolling it from one or more spools, spreading it in sheets at different points upon a cushion-table, and then successively rolling it about a rod or mandrel it can be manipulated with ease and rapidity, and each ply can be rolled up smoothly and evenly by one operation extended sufficiently to permit the plies to be successively rolled up.

In the accompanying drawings, Figure 1 represents in top plan a series of such pieces of unvulcanized rubber film arranged upon an elastic bed or cushion-table. Fig. 2 shows the same in side elevation with one of the pieces rolled about the mandrel. Fig. 3 is a like view showing two of the pieces completely rolled about the mandrel and the third partially rolled up. Fig. 4 shows in cross-section the multiply tube on the mandrel. Fig. 5 shows the tube in longitudinal section removed from the mandrel and having its ends flattened down and closed. Fig. 6 illustrates the end edges of three plies of film of different relative thickness, the surface of the cushion-table being indicated by a single line.

The cushion-table A can be formed by any suitable yielding and elastic material, a simple and efficient construction being to form the cushion portion of felt having a covering of cloth. The film is made of unvulcanized rubber, and to such end the rubber-stock is passed through suitable calender-rolls. A convenient way of supplying the rubber film to the cushion-table is to form the film in strips of the required width and of indefinite length and to roll up such strips on spools B, with a layer of cloth between the convolutions. These spools can be arranged at one end of the cushion-table, so that preparatory to forming an air-tube a suitable strip or long narrow sheet C of film can be unwound, laid upon the table, and severed from the remaining portion of the strip, the cloth being of course removed from the strips or sheets of film preparatory to rolling them out. The strips or sheets C of film are each proportional in length to the length of the proposed tube which is to be formed by rolling them about the mandrel, and each strip or sheet C of film is also desirably of a width to permit its longitudinal edge portions to lap when it is rolled into tubular form. The sheets C of film, which form the plies of the multiply tube, are conveniently arranged side by side and at such distances apart that when they are severally rolled up to form the multiply tube the laps will be along separate lines having their relative distances apart determined by the spaces between the sheets as arranged upon the cushion-table. In this way I can avoid having the laps in register with one another, and thereby avoid unduly thickening the tube at any one point. Where the sheets of film are of different kinds of stock or of different relative thickness, or both, it would be possible, by extremely careful handling, to lay the longitudinal edge portion of one sheet of film upon the longitudinal edge portion of the next adjacent sheet of film; but such method will be less desirable, owing to the fact if the second sheet is not properly laid in the first instance its rearrangement will be difficult, owing to the tendency of the sheets of film to adhere when brought into contact with one another, although by such arrangement the laps could be made to occur along different lines in the completed multiply tube. The several plies or sheets of film are then successively rolled about a rod or mandrel D and in direct contact with one another, and while being thus rolled up the mandrel is suitably depressed, so as to compress the sheets or plies of film between the mandrel and the cushion-table, and thereby roll the plies smoothly and evenly and exclude air from between them. While I do not confine myself to manually rolling the mandrel over the cushion-table and sheets of film thereon, I prefer such mode, owing to the ease and rapidity involved, and the further fact that the rolling up of the film can be governed by the workmen. The multiply tube thus formed about the mandrel is then vulcanized, so as to unite the plies as one piece and adapt the tube for service in a pneumatic tire-sheath, it being understood that the ends of the tube can be closed in any known or suitable way, or that they can be telescoped, as may be desired. The tube can be vulcanized upon the mandrel, or it can be removed therefrom and then vulcanized, the latter being the most desirable and expeditious mode of procedure. The plies or sheets of film are each arranged upon the cushion-table preparatory to rolling them up into tubular form about the mandrel and upon one another. The workmen could first place one sheet of film upon the cushion-table and roll it up, and then place another sheet of film upon the cushion-table and roll it up about the sheet of film already rolled about the mandrel, in which case, however, it will be seen that the operation would involve spreading the sheets of film upon the table preparatory to rolling them up into tubular form, and also involve successively rolling up a plurality of such sheets; but as a more economical and better mode and matter of further improvement all of the sheets of film intended to be used in any one tube can in the first instance be properly arranged upon the cushion-table and then rolled up by one operation of the mandrel.

With further reference to certain advantages secured by rolling up sheets or plies of film of different kinds or grades of stock or of different relative thickness, or of both different relative thickness and different kinds or grades of stock, one or more of the plies—for example, the middle ply—can be formed of rubber-stock compounded with mineral or fibrous matter to render it tougher and less liable to puncture, and such ply can also be made somewhat thicker than the remaining plies, or the ply thus formed can be arranged to form the inner side or the outer side of the tube. As a further advantage incident to forming and rolling up the plies as hereinbefore set forth, one ply can be arranged so that the grain or fiber of the rubber will lie transverse to the grain or fiber of the next adjacent ply or plies, it being observed that in producing these plies by running the rubber-stock between calender-rolls the grain or fiber of the rubber will run longitudinally along the strip or ply thus produced, and hence certain of the plies be so cut from a wide sheet of film as to permit the fiber of the rubber therein to run transverse to the fiber of the rubber in the next adjacent ply, by which arrangement a tube less liable to puncture or rupture can be produced.

What I claim as my invention is—

The within described process of preparing elastic, inflatable inner air-tubes for pneumatic tires, consisting essentially in the following steps, to wit:—forming unvulcanized rubber stock into sheets of thin film; spreading a plurality of such sheets of film preparatory to rolling them into tubular form; successively rolling up a plurality of such sheets directly upon one another so as to form a multiply tube, composed of plies of unvulcanized rubber film in direct contact with one another, and during such operation subjecting the plies of film to compression; and vulcanizing the multiply tube thus formed so as to unite the plies as one piece and adapt the tube for service in a pneumatic tire sheath.

FRED W. MORGAN.

Witnesses:
RETA M. WAGNER,
ARTHUR H. DURAND.